United States Patent [19]

Zengel et al.

[11] 4,178,315
[45] Dec. 11, 1979

[54] PROCESS FOR THE PREPARATION OF NITROSOBENZENE

[75] Inventors: Hans Zengel, Kleinwallstadt; Manfred Bergfeld, Erlenbach, both of Fed. Rep. of Germany

[73] Assignee: Akzona Incorporated, Asheville, N.C.

[21] Appl. No.: 889,810

[22] Filed: Mar. 24, 1978

[30] Foreign Application Priority Data

Mar. 28, 1977 [DE] Fed. Rep. of Germany ....... 2713602

[51] Int. Cl.$^2$ .............................................. C07C 76/00
[52] U.S. Cl. ................................................... 260/647
[58] Field of Search ....................................... 260/647

[56] References Cited

U.S. PATENT DOCUMENTS

| 2,684,359 | 7/1954 | Sogn | 260/647 X |
| 3,989,764 | 11/1976 | Wooley | 260/647 |

FOREIGN PATENT DOCUMENTS 1203698  9/1970  United Kingdom .................... 260/647

Primary Examiner—Leland A. Sebastian
Attorney, Agent, or Firm—Francis W. Young; Robert F. Green

[57] ABSTRACT

An improved process for the preparation of nitrosobenzene by the catalytic reduction of nitrosobenzene is disclosed. The improvement in the process comprises utilizing as a reducing agent a compound selected from the group consisting of aliphatic compounds containing from about one to about twenty carbon atoms, benzene, naphthalene and ethylenically unsaturated compounds containing from about two to about 10 carbon atoms.

10 Claims, No Drawings

PROCESS FOR THE PREPARATION OF NITROSOBENZENE

BACKGROUND OF THE INVENTION

This invention relates to an improved process for the preparation of nitrosobenzene by the catalytic reduction of nitrobenzene.

According to the classical process, nitrosobenzene is obtained through the oxidation of phenyl hydroxylamine by means of a chromic acid mixture (Bamberger, B. 27, 1955), or by means of a neutral potassium permanganate solution (Bamberger et al., B. 31, 1524; B. 32, 342; A. 311, 78), through the oxidation of aniline by means of monoperoxysulfuric acid (Caro, Z. angew. Chem. 11, 845; German Pat. No. 110,575), or through reduction of nitrobenzene by means of zinc powder (W. J. Mijs et al., Recueil 77, 746–752). A series of other methods for the making of nitrosobenzene are also known, but they are not suitable for either small-scale or large-scale preparation of nitrosobenzene (Beilsteins Handbuch der Organischen Chemie, vol. 5, H. 230, I 123, II 169 and III 585).

In the small-scale preparation of nitrosobenzene one may commence by catalytically reducing nitrobenzene, using carbon monoxide, suitable aldehydes, ketones, or alcohols. According to a method described in German Pat. No. 1,810,828, nitrobenzene may be reduced with carbon monoxide at temperatures from 100 to 140° C., wherein the catalyst consists of two or more of the heavy metals Ti, V, Cr, Mn, Fe, Co, Ni, Cu, Ge, Zr, Mo, Ag, Sn, Sb, La, Ce, Nd, Ta, W, Re, Au, Hg, Tl, Pb, Bi and Th, in the form of their oxides, hydroxides, carbonates, or basic phosphates, or in the form of partial reduction products. The catalyst may be prepared by means of a process consisting in essence of a joint precipitation from a solution, or a joint heating of the mentioned heavy metals in the form of their hydroxides, or in the form of thermally unstable salts, or mixtures thereof. According to a process described in British Pat. No. 1,322,531, with higher yield and selectivity, the catalyst to be used in the reduction of nitrobenzene by means of carbon monoxide is prepared in such a way that, first, a layer of one of the oxides of silver, cooper or lead is applied by thermal decomposition of a suitable metal salt on a carrier material, such as pumice, asbestos, diatomaceous earth, etc. and subsequently, above the first oxide layer, there is applied a second layer of one of the oxides of manganese, iron, copper, chromium, vanadium or cerium. Only certain combinations of the two layers are possible.

Another catalyst suitable for the reduction of nitrobenzene to nitrosobenzene by means of carbon monoxide is described in British Pat. No. 1,259,504. It is obtained by treating a manganese oxide precipitate still containing bound alkali with a solution of one or several of the metals Ti, V, Cr, Fe, Co, Ni, Cu, Zr, Mo, Ag, Sn, Sb, Ta, W, Re, Au, Hg, Tl, Pb and Bi, as a result of which the alkali is replaced by the heavy metal, followed by filtering off and drying of the solid substance.

The catalyst described in Dutch published patent application No. 7,005,588, which is prepared from a magnesium oxide precipitate containing alkali and treated with the solution of salts of the metals Co, Cu, Ag and Pb, is said to be suitable for the same purpose. Furthermore, catalysts are recommended for the reduction of nitrobenzene to nitrosobenzene by means of carbon monoxide, which consist of heavy metal formates (British Pat. No. 1,251,836), heavy metal oxalates (British Pat. No. 1,251,844), or of palladium/carbon (Japanese Pat. No. 4,731,937). According to the process of Japanese Pat. No. 9,126,633, nitrosobenzene can also be prepared through photoreduction by means of certain metal carbonyl compounds.

The catalytic reduction of nitrobenzene to nitrosobenzene by means of aldehydes, ketones, or alcohols is known from German Pat. No. 2,346,388. As reducing agents, mention may be made of acetaldehyde, metaldehyde, acetone, methylethylketone, butanol-2, allyl alcohol, 2-methylpropanol, n-butanol, n-propanol, isopropanol, ethanol and methanol. The catalysts to be used consist of one of the heavy metals Sb, Bi, Ce, Cr, Co, Cu, Ge, Au, Fe, La, Pb, Mn, Hg, Mo, Nd, Ni, Re, Ag, Ta, Tl, Th, Sn, Ti, W, V and Zr in association with oxygen atoms or hydroxyl, carbonate or phosphate ions, and additionally contain at least one of the other mentioned heavy metals, which forms contaminating atoms in the lattice.

SUMMARY OF THE INVENTION

An improved process for the preparation of nitrosobenzene by the catalytic reduction of nitrobenzene has now been discovered. The improved process is characterized by the fact that an aliphatic, cycloaliphatic, olefinic, or aromatic hydrocarbon is utilized as the reducing agent in the reduction process. In particular, the improvement in the process comprises utilizing as a reducing agent the compound selected from the group consisting of aliphatic compounds containing from about one to about twenty carbon atoms, cycloaliphatic compounds containing from about four to about twelve carbon atoms, benzene, napthalene, and ethylenically unsaturated compounds containing from about two to about 10 carbon atoms.

DETAILED DESCRIPTION OF THE PREFERRED EMBODIMENTS

As discussed, the improved process for the preparation of nitrosobenzene by the catalytic reduction of nitrobenzene utilizes a class of reducing agents which has heretofore never been used in such a process. The improved process of the present invention may be distinguished from, for example, the process disclosed in U.S. Pat. No. 3,504,035, by the fact that the present process leads to a different reaction product and the present process is based on an entirely different reaction mechanism from the process discussed in said patent. The present process proceeds at a substantially lower temperature and thus contains no reforming process stage.

As previously discussed, the group of compounds which are useful as reducing agents in the present process comprises aliphatic compounds containing from about one to about twenty carbon atoms, cycloaliphatic compounds containing from about four to about twelve carbon atoms, benzene, napthalene, and ethylenically unsaturated compounds containing from about two to about 10 carbon atoms.

Examples of suitable aliphatic compounds containing from about one to about twenty carbon atoms are methane, ethane, propane, butane, hexane, n-decane, and the like.

Examples of suitable cycloaliphatic compounds containing from about four to about twelve carbon atoms include cyclobutane, cyclopentane, cyclohexane, and cycloheptane. The useful aromatic compounds, as discussed, are benzene and naphthalene. Of course, the benzene and napthalene may be substituted and such useful substituted compounds include, for example, toluene, ethyl benzene, isopropyl benzene, and p-xylene.

With respect to the useful ethylenically unsaturated compounds containing from about two to about 10 carbon atoms, reference may be made to compounds such as ethylene, propylene, 1-decene, cyclopentadiene, cycloheptene, cyclohexadene-1,3, and styrene. Thus, the ethylenic unsaturation may be contained in not only olefinic compounds, but also cycloolefinic compounds and in substituents attached to other compounds, such as aromatic compounds.

The preferred reducing agents are methane, benzene, hexane, and petroleum hydrocarbons containing $C_4$ to $C_8$ hydrocarbons.

The catalysts which are useful in the present process include the known metal catalysts which are already used in the known processes for the preparation of nitrosobenzene by means of the reduction of nitrobenzene with carbon monoxide, aldehydes, ketones or alcohols. In this connection, reference is made to German Pat. No. 1,810,828, British Pat. Nos. 1,322,531, 1,259,504, 1,251,836, and 1,251,844, Dutch published patent application No. 7,005,588, Japanese published patent application Nos. 4,731,937 and 9,126,333, and German Pat. No. 2,346,388.

Preferably, the catalysts used are the known manganese oxide-lead oxide catalysts. Such catalysts consist of a mixture of manganese oxide and lead oxide applied to a suitable carrier material, such as pumice, aluminum oxide, activated carbon, asbestos, brick, or diatomaceous earth. The atomic ratio of manganese to lead may vary greatly, but in general it is within a range from about 20:1 to about 2:1. Such catalysts are preferred, which contain manganese and lead in a ratio of 2 atoms manganese to one atom of lead. Reference is made to the following known processes, so far as the preparation of the catalysts to be used in the process pursuant to the invention is concerned:

a. A possibility for the preparation of such catalysts consists in the joint precipitation of the oxides on the carrier material from solutions of the metals. An example thereof is Explanatory Example 13 of German Pat. No. 1,810,828, according to which a suspension of the carrier material, in this case activated carbon, in an aqueous solution of lead and manganese nitrate is mixed with sodium hydroxide; the precipitate is decanted and washed several times, and finally dried. Explanatory Example 14 of German Pat. No. 1,901,202 is mentioned as an additional example of this procedure.

b. Another method for the preparation of such catalysts consists in heating a thorough mixture of the carrier material which manganese and lead hydroxides, carbonates or nitrates, or with thermally unstable organic manganese and lead salts, such as formates, acetates or oxalates, to the decomposition temperature of the metal salts. An example thereof is Explanatory Example 1 of German Pat. No. 2,346,388, according to which pumice granules are impregnated with a mixture of manganese and lead nitrate and, in order to form the oxides, are heated to 400° C. It is of course also possible to use mixtures of hydroxides, carbonates or nitrates with the thermally unstable organic salts.

c. According to another process, potassium permanganate is dissolved in aqueous alkali hydroxide, dispersed with the carrier material, and subsequently reduced by means of formaldehyde, acetaldehyde, methanol, ethanol or glucose. The resulting mass is then freed from alkali by washing and treated with a water-soluble lead salt. Examples thereof are Explanatory Example 2/1 of German Pat. No. 2,346,388 and Explanatory Example 1 of British Pat. No. 1,259,504.

d. An additional process for the preparation of the catalysts to be used pursuant to the present invention is the heating to about 400° C. of manganese carbonate, which has first been impregnated with a solution of lead nitrate or lead acetate in the desired Mn/Pb ratio. With regard thereto, reference is made to Explanatory Example 2/2 of German Pat. No. 2,346,388.

e. Furthermore, reference is made to a process described in Example 5 of British Pat. No. 1,259,504. According to it, a manganese oxide precipitate, obtained by treating a manganese salt with an alkali hydroxide in the presence of an oxidant, such as oxygen or hypochlorite, which precipitate still contains bound alkali, is suspended in water and digested with the solution of a lead salt for such a length of time, until the exchange of the alkali against the lead has come to an end.

f. Finally, mention must also be made of the process described in British Pat. No. 1,322,531, according to which first a layer of lead oxide and then a layer of manganese oxide is deposited on a carrier material by means of thermal decomposition.

As has surprisingly been found, the activity and selectivity, as well as the running time of the catalysts to be used in keeping with the invention can be substantially increased by a preliminary treatment of the same with a hydrocarbon or hydrogen. The hydrocarbons which are so useful are the compounds already listed as reducing agents. Preferably, the hydrocarbon to be used as a reducing agent is also used for the preliminary treatment which may be carried out at about 300° to about 400° C. and may last 0.5 to 10 hours. According to a preferred version of the process pursuant to the invention, the catalyst, in the absence of nitrobenzene, is therefore subjected to a preliminary treatment by heating it for 0.5 to 10 hours, preferably 1 to 3 hours, in one of the hydrocarbons to be used as reducing agent, or in hydrogen, at temperature of about 300° to about 400° C.

The process pursuant to the present invention is carried out at temperatures in a range from about 250° to about 450° C., preferably at temperatures from about 320° to about 410° C. It is thereby vastly unimportant which catalyst and which hydrocarbons are used. It must be considered extremely surprising that the hydrocarbons, in the process pursuant to the present invention, are oxidized at such relatively low temperatures.

Generally, the present process is carried out under atmospheric pressure, for example in the gaseous phase. For technical reasons it is often advantageous to operate under a somewhat higher pressure, such as at pressures up to 1.5 bar. However, it is also possible to execute the reaction under higher pressures such as up to about 15 bar, for example, sometimes in the liquid phase.

In the gaseous phase, it has been found advantageous to make use of a diluent and the inert gases, such as carbon dioxide, nitrogen, and the rare gases, are suitable for such a purpose.

The process pursuant to the invention may be carried out continuously, as well as discontinuously. For example, in the continuous operating method to be considered for an industrial-scale execution of the process, the nitrobenzene is evaporated, if necessary heated and, jointly with the vaporous hydrocarbon, brought in contact with the catalyst. Advantageously, the mixture of reactants is conducted over, or through a bed of catalyst in a pipe reactor, either flowing in the same direction, or in a countercurrent. Customary solid, or fluidized bed technology may be used thereby. The flow velocities of the gases are adapted to the desired contact times. In order to suppress further reaction of the nitrosobenzene, use may be made of contact times that are as short as possible and thus, especially if fluidized bed technology is applied, high flow velocities are maintained. Generally, contact times are within a range from about 0.5 to about 40 seconds, preferably about 1 to about 10 seconds.

The reaction mixture is processed in a simple manner by chilling it. Thereby, the biggest part of the less volatile and undesirable by-products, such as azobenzene, azoxybenzene and aniline is condensed first. The remaining gas, which contains the desired nitrosobenzene and unreacted nitrobenzene is then subjected to fractionation, condensation, or distillation.

In the execution of the preferred version of the process pursuant to the invention, according to which the catalyst is subjected to a preliminary treatment before coming in contact with the nitrobenzene, it is best to transfer the catalyst, after it has been dried, to the reactor, where it is treated with a hydrocarbon or hydrogen for about 2 hrs. at about 400° C. with the exclusion of air, whereupon the nitrobenzene is gradually fed in. A decline in the activity of the catalyst, which may gradually take place after a continuous operation lasting for weeks can easily be nullified again during the operation of the reactor by temporarily discontinuing the supply of nitrobenzene while maintaining the reaction temperature, so that in this manner the catalyst will for several hours be flushed with pure hydrocarbon or, as the case may be, hydrogen.

Compared with the known processes for the preparation of nitrosobenzene, the process pursuant of the present invention offers considerable advantages. Surprisingly, the catalysts will display higher reaction rates, a higher selectivity and considerably longer running times if, instead of the oxygen-containing reducing agents of the known processes, use is made of the reducing agents free from oxygen of the process pursuant to the invention. The prerequisites of a process for the preparation of nitrosobenzene by means of the reduction of nitrobenzene that can be realized technologically, are created only by this fact. According to the preferred version of the process pursuant to the invention, the activity and running time of the catalysts can be increased even more, if the latter are activated by means of a hydrocarbon, or hydrogen, at an elevated temperature. Whereas in the known processes the catalysts already show a strong loss in activity after 5 to 10 hours, so that the process has to be interrupted and the catalysts exchanged, or regenerated, the catalysts in the process pursuant to the invention show slight losses in activity only after an uninterruptd use of several weeks, but they can be regenerated within a short time and without shutting down of the installation. The possibility has thus been provided for the first time, to prepare nitrosobenzene in a fully continuous process with practically unlimited duration of operation by means of the reduction of nitrobenzene.

The present invention is described in further detail by the following non-limiting examples.

EXAMPLE 1

(Catalyst Preparation 1)

A pumice stone comminuted to particles of about 1 mm average diameter as used as a carrier and steeped in an aqueous solution of a mixture of lead nitrate and manganese nitrate ($Pb/Mn = \frac{1}{2}$ mol/mol), whereupon it was dried under a vacuum at 50° C. in a rotary evaporator. Afterwards, it was treated for about 2 hrs. at 400° C. under the influence of air. It was then used in the reaction.

EXAMPLE 2

(Catalyst Preparation 2)

First, the procedure followed was as outlined in Example 1. Subsequently, however, after drying in the rotary evaporator, the catalyst was directly placed in the reactor and there treated for 2 hrs. at about 400° C. with methane. Great care was taken to prevent any access of air. After the methane treatment, the reactor, in which the flow of methane was maintained, was taken into operation with nitrobenzene.

EXAMPLE 3

A gas mixture consisting of nitobenzene and methane, preheated to 396° C., was conducted through a glass pipe of about 50 cm length with an inside diameter of 1 cm and containing 13 cc of a freshly prepared Pb/Mn catalyst (preparation 1, Example 1) in the form of 1 mm pellets. The throughput amounted to 27 g/hr. (0.22 mol) of nitrobenzene and 40 Nl/hr. (1.79 mol) of methane. After leaving the reaction pipe which, by means of electrical heating, had been kept practically isothermally at 396° C., the reaction mixture was chilled indirectly to 25° C. in a water cooler and the constituents of low volatility separated. Small quantities of compounds with low volatility were thereby also discharged; they were absorbed in the dioxane-filled washer, which followed.

Under the foregoing conditions, a nitrobenzene conversion of 15% was reached after one hour, resulting in the formation of nitrosobenzene with 95% selectivity. The remaining 5% were composed of azoxybenzene, azobenzene and aniline.

EXAMPLE 4

Operating under the same conditions as in Example 3, and using the same catalyst, another check was made after a reaction time of 100 hrs. The nitrobenzene conversion rate was now 7%, while the selectivity remained practically constant at 95%.

EXAMPLE 5

13 cc of a Pb/Mn catalyst, freshly prepared in keeping with Example 2, were placed in the equipment described in Example 3. Analogous to Example 3, the throughout was 27 g/hr. of nitrobenzene and 40 Nl/hr. of methane at 396° C. Processing was likewise analogous to Example 3. After one hour, the nitrobenzene conversion rate was 24% and the selectivity 95%.

EXAMPLE 6

The process described in Example 5 was continued over an extended period. After 100 hours, the nitrobenzene conversion rate was still 15%, while after 200 hrs. it was likewise still between 14 and 15%, i.e. after this time it had reached an approximately stable level. The selectivity was at an unchanged high level of more than 90% of the theory.

EXAMPLE 7 TO 15

0.22 mol/hr. of nitrobenzene vapor and various hydrocarbons as listed in the following Table I, were reacted one after the other at 380° C. in the reaction pipe described in Example 3 (catalyst preparation 1). Nitrobenzene was converted to nitrosobenzene in all cases, although in somewhat varying quantities. The selectivity was in all cases between 90 and 95%. In these examples, the yields are generally a little low, since the reaction temperatures are comparatively low (cf. Examples 5 and 6).

TABLE I

| Example No. | Hydrocarbon | Hydrocarbon throughput (mol/hr.) | Nitrosobenzene yield (%) |
|---|---|---|---|
| 7 | methane | 0.42 | 7.0 |
| 8 | butane | 0.42 | 4.7 |
| 9 | cyclohexane | 0.30 | 7.7 |
| 10 | benzene | 0.36 | 10.3 |
| 11 | toluene | 0.30 | 7.8 |
| 12 | isopropylbenzene | 0.23 | 7.0 |
| 13 | naphthalene | 0.20 | 1.4 |
| 14 | propylene | 0.42 | 3.3 |
| 15 | n-decane | 0.17 | 2.8 |

EXAMPLE 16

The apparatus as described in Example 3 was charged with 13 cc of a Pb/Mn catalyst, freshly prepared in keeping with Example 2. After activation for 2 hours at 400° C. with methane, the flow of methane was replaced by hexane. After another 15 minutes, the reactor was taken into operation through the metering in of nitrobenzene. The throughput was 27 g/hr. of nitrobenzene (0.22 mol) and 156 g/hr. of hexane (1.81 mol). The gas mixture was heated to 396° C., passed through the reaction pipe at this temperature under isothermal conditions and was subsequently indirectly chilled to 25° C. in a water cooler, whereby the entire reaction mixture was eliminated. Subsequent absorption (as in Example 3) was not required. A nitrobenzene conversion rate of 20 to 22% was reached under these conditions, while the nitrosobenzene selectivity amounted to 92 to 93% of the theory.

COMPARATIVE EXAMPLES 17 TO 27

Comparative Examples 17 to 19 correspond to Example 1 of German No. 2,346,388, with methanol as reducing agent. As shown by the results listed in the following Table II, with a temperature of 217° to 247° C. in the catalyst column the initial nitrosobenzene yield of 5.4 mol % drops already within 40 min. to less than half and, after an operating period of 3 hrs. it declines further to 2.2 mol %.

Analogous to the manner described in Example 3, above, Comparative Examples 20 to 27 were carried out with a mixture of nitrobenzene and 5% methanol. The reaction took place in the gas phase, making use of the reaction pipe described in Example 3, which had been filled with 13 cc of a catalyst freshly prepared in keeping with Example 1. The conversion rates and selectivities, in dependence upon reaction time and reaction temperature, are compiled in the following Table II.

TABLE II

| Example No. | Time hrs. | Temp. °C. | Conversion rate mol % | Nitrosobenzene mol % | Selectivity (mol %) referred to nitrosobenzene | Aniline mol % | Azobenzene mol % | Azoxybenzene mol % |
|---|---|---|---|---|---|---|---|---|
| 17 | 0.66 | 217-247 | | 5.4 | | | | |
| 18 | 0.66 | 217-247 | | 2.6 | | | | |
| 19 | 3.0 | 217-247 | | 2.2 | | | | |
| 20 | 0.1 | 285 | 9.6 | 7.6 | 79.2 | 0.55 | 0.11 | 1.0 |
| 21 | 1.5 | 285 | 7.1 | 5.8 | 81.7 | 0.25 | 0.05 | 0.6 |
| 22 | 4.0 | 285 | 4.0 | 3.1 | 77.5 | 0.1 | 0.04 | 0.5 |
| 23 | 0.1 | 350 | 19.2 | 13.2 | 68.8 | 1.5 | 0.95 | 2.75 |
| 24 | 1.5 | 350 | 19.8 | 10.65 | 53.8 | 1.85 | 2.4 | 3.75 |
| 25 | 4.0 | 350 | 20.4 | 9.6 | 47.0 | 3.25 | 3.5 | 3.4 |
| 26 | 0.1 | 396 | 30.2 | 11.2 | 37.0 | 2.1 | 0.1 | 13.9 |
| 27 | 3.0 | 396 | 18.6 | 4.0 | 21.5 | 4.5 | 0.1 | 7.3 |

The results in Table II show that in the known process of German Pat. No. 2,346,388, the conversion rates and/or selectivities suffer a strong decline already after 3 to 4 hours.

EXAMPLES 28 AND 29

Use was made of a pumice carrier, comminuted to granules of an average diameter of about 1 mm, which were steeped in an aqueous solution of lead/manganese nitrate (lead/manganese=½ mol/mol) and then dried under a vacuum at 50° C. in a rotary evaporator. The catalyst was now filled into a pipe of about 50 cm length, with an inside diameter of 1 cm and a volume of 13 cc and subsequently, within 2 hrs., slowly heated to 400° C. in a stream hydrogen. After the catalyst had thus been activated under hydrogen, the flow of hydrogen was replaced by a flow of methane of 40 Nl/hr. (1.79 mol), and simultaneously 27 h/hr. (0.22 mol) of nitrobenzene at 395° C. were conducted over the catalyst. The following Table III shows conversion rates and selectivities in dependence upon the reaction time.

TABLE III

| Example No. | Time hrs. | Temp. °C. | Conversion rate mol % | Nitrosobenzene mol % | Selectivity (mol %) referred to nitrosobenzene | Aniline mol % | Azobenzene mol % | Azoxybenzene mol % |
|---|---|---|---|---|---|---|---|---|
| 28 | 0.25 | 395 | 32.13 | 26.33 | 81.97 | 1.43 | 3.66 | 0.70 |
| 29 | 2 | 395 | 30.85 | 25.16 | 81.56 | 1.19 | 3.86 | 0.82 |

EXAMPLES 30 TO 33

The equipment as described in Example 3 was charged with 13 cc of a lead/manganese catalyst, freshly prepared as in Example 2. After activation for 3 hrs. with methane at 400° C., part of the flow of methane was replaced with carbon dioxide. After another 15 min., the reactor was taken into operation by the metering-in of nitrobenzene. The throughput amounted to 23.76 ml (0.232 mol) of nitrobenzene, 13.33 Nl/hr. (0.595 mol) of methane and 26.66 Nl/hr. (1.19 mol) of carbon dioxide. After leaving the reaction pipe, which had been kept practically isothermal at 392° C. by means of electrical heating, the reaction mixture was subjected to processing analogous to Example 3. Yield and selectivity, in dependence upon the reaction time, are compiled in the following Table IV.

TABLE IV

| Example No. | Time hrs. | Temp. °C. | Conversion rate mol % | Nitrosobenzene mol % | Selectivity (mol %) referred to nitrosobenzene | Aniline mol % | Azobenzene mol % | Azoxybenzene mol % |
|---|---|---|---|---|---|---|---|---|
| 30 | 40 | 392 | 21.52 | 18.98 | 88.20 | 0.75 | 1.34 | 0.45 |
| 31 | 100 | 392 | 23.19 | 20.27 | 87.45 | 0.78 | 1.58 | 0.55 |
| 32 | 160 | 392 | 25.11 | 22.18 | 88.33 | 0.87 | 1.49 | 0.57 |
| 33 | 250 | 392 | 29.57 | 25.85 | 87.48 | 1.07 | 1.83 | 0.80 |

EXAMPLES 34 TO 36

Analogous to Examples 3, a glass pipe of 50 cm length and an inside diameter of 3 cm, which contained 45 g of a freshly prepared lead/manganese catalyst (preparation of Example 1) in the form of 1 mm pellets was heated to 335° C. and a gas mixture of nitrobenzene, methane and nitrogen, heated to the same temperature, was continuously conducted over it. The throughput amounted to 54 g/hr. (0.44 mol) of nitrobenzene, 45 Nl/hr. of nitrogen and 17 Nl/hr (0.76 mol) of methane. Processing wasd carried out analogous to Example 3. Yields and selectivities, in dependence upon the time, are compiled in the following Table V.

TABLE V

| Example No. | Time hrs. | Temp. °C. | Conversion rate mol % | Nitrosobenzene mol % | Selectivity (mol %) referred to nitrosobenzene | Aniline mol % | Azobenzene mol % | Azoxybenzene mol % |
|---|---|---|---|---|---|---|---|---|
| 34 | 0.5 | 335 | 20.12 | 17.78 | 88.36 | 0.39 | 0.31 | 0.45 |
| 35 | 1.5 | 335 | 15.27 | 14.04 | 91.94 | 0.26 | 0.22 | 0.33 |
| 36 | 3 | 335 | 11.71 | 10.44 | 89.15 | 0.16 | 0.15 | 0.21 |

What is claimed is:

1. An improved process for the preparation of nitrosobenzene by the catalytic reduction of nitrobenzene wherein the improvement comprises utilizing as a reducing agent a compound selected from the group consisting of aliphatic compounds containing from about one to about twenty carbon atoms, cycloaliphatic compounds containing from about four to about twelve carbon atoms, benzene, naphthalene, and ethylenically unsaturated compounds containing from about two to about 10 carbon atoms.

2. The process of claim 1 wherein a mixture of manganese and lead oxides is utilized as a catalyst.

3. The process of claim 1 wherein the reduction is performed at a temperature from about 250° C. to about 450° C.

4. The process of claim 1 wherein the reducing agent is selected from the group consisting of methane, ethane, propane, butane, hexane, and n-decane.

5. The process of claim 1 wherein the reducing agent is selected from the group consisting of cyclobutane, cyclopentane, cyclohexane, and cycloheptane.

6. The process of claim 1 wherein the reducing agent is selected from the group consisting of benzene and naphthalene.

7. The process of claim 1 wherein the reducing agent is selected from the group consisting of methane, benzene, hexane, and petroleum hydrocarbons containing $C_4$ to $C_8$ hydrocarbons.

8. The process of claim 1 wherein the reduction is carried out in the presence of an inert gas.

9. The process of claim 8 wherein the inert gas is carbon dioxide, nitrogen, or a rare gas.

10. The process of claim 1 wherein the improvement also comprises heating a catalyst for a period from about 0.5 to about 10 hours in the presence of hydrogen or the reducing agent, at a temperature from about 300° C. to about 400° C., prior to using the catalyst in the reduction of the nitrobenzene.

* * * * *